(12) United States Patent
Tokuda

(10) Patent No.: US 7,233,081 B2
(45) Date of Patent: Jun. 19, 2007

(54) POWER-SUPPLY DEVICE

(75) Inventor: Hirokazu Tokuda, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 397 days.

(21) Appl. No.: 10/939,479

(22) Filed: Sep. 14, 2004

(65) Prior Publication Data

US 2005/0068699 A1 Mar. 31, 2005

(30) Foreign Application Priority Data

Sep. 30, 2003 (JP) ............................. 2003-341351

(51) Int. Cl.
*H02J 3/14* (2006.01)
*H02J 3/16* (2006.01)
*H02J 3/50* (2006.01)
*H02J 1/02* (2006.01)

(52) U.S. Cl. ..................... 307/52; 307/87; 307/103; 307/105

(58) Field of Classification Search ............... 307/103
See application file for complete search history.

(56) References Cited

U.S. PATENT DOCUMENTS 5,659,463 A * 8/1997 Lee ..................... 363/25

6,522,119 B1 * 2/2003 Hernandez ............... 323/324

FOREIGN PATENT DOCUMENTS

| JP | 62-203560    | 9/1987  |
|----|--------------|---------|
| JP | 2000-287447  | 10/2000 |
| JP | 2001-008462  | 1/2001  |
| JP | 2001-128390  | 5/2001  |
| JP | 2002-325465  | 11/2002 |
| JP | 2003-079161  | 3/2003  |

* cited by examiner

*Primary Examiner*—Robert L. Deberadinis
*Assistant Examiner*—Adi Amrany
(74) *Attorney, Agent, or Firm*—Rabin & Berdo, P.C.

(57) ABSTRACT

A power-supply device suppresses high harmonic waves, controls the flow of AC power, and minimizes adverse effects on a load that might otherwise be caused by a large surge of current into the load during the startup or stopping of the power-supply device. The power supply device includes a voltage supply unit 2 disposed in series between input and output terminals. This voltage supply unit functions to gradually lower the output-voltage level from a state of canceling the voltage across input terminals of the power supply device at the time of starting up the power-supply device, so that a gradual rise in the output voltage from the power-supply device is achieved. When the power-supply device is stopped, a gradual lowering of the output voltage from the power-supply device is obtained by gradually increasing the output voltage of the voltage supply unit so as to cancel the input voltage.

10 Claims, 12 Drawing Sheets

POWER-SUPPLY DEVICE

CROSS-REFERENCE TO RELATED APPLICATION

This application claims the benefit of priority of Japanese patent application number 2003-341351, filed on Sep. 30, 2003, and the entire disclosure of this priority application is incorporated herein by reference.

BACKGROUND OF THE INVENTION

1. Field of the Invention

The invention relates to a power-supply device. More particularly, the invention relates to a power-supply device incorporating the function of converting an input voltage (such as an output voltage from an uninterruptible commercial power-supply device) and controlling an output voltage, or incorporating a series-parallel-type active filter or a control unit for controlling the flow of electric power, for example.

2. Background Art

First, as an example of the conventional art, the constitution of an uninterruptible commercial power-supply device is described below. The conventional art related to this power-supply device has been disclosed in Japanese Patent Publication (Laid-Open) No. JP 2001-128390. According to this patent document, the uninterruptible power-supply device consists of a series inverter functioning as a first voltage-supplying means, and a parallel compensatory capacitor functioning as a second voltage-supplying means. As described in paragraph [0004] of JP 2001-128390, by directly adding a compensatory output voltage from the first voltage-supplying means to an output voltage from the second voltage-supplying means, the output voltage is held at a rated value. In other words, by controllably operating a voltage output from the first voltage-supplying means, the above uninterruptible power-supply device advantageously keeps the output voltage constant, even when the input voltage varies. It is further possible to optionally vary the output voltage within a predetermined capacity of the above power-supply device.

Further, other conventional art is also known which, based on the principles cited above, properly compensates for the higher harmonic components of an output voltage when a voltage generated in an input power-supply line contains such higher harmonic components, by causing a first voltage-supplying means to generate a higher harmonic voltage containing the opposite phase. This conventional art is disclosed in the above-cited JP 2001-128390 and in Japanese Patent Publication (Laid-Open) No. JP 2001-161098.

As it is possible to vary the phases of the input and output voltages through the application of the first voltage-supplying means, the above art enables the realization of a phase-shifter. On the other hand, the flow of AC power can be controlled through the phase of the voltage, and thus the above art is also able to control the flow of AC power. The conventional art disclosed in both of the above-mentioned patent publications has been realized by combining the output voltage of the second voltage-supplying means or the input voltage at the input terminal with the output voltage of the first voltage-supplying means.

DISCLOSURE OF THE INVENTION

The prior art disclosed in JP 2001-128390 and JP 2001-161098 fails to provide any specific means for startup and stopping of the uninterruptible power-supply devices. Due to this failure, there was a problem of surge currents adversely affecting the power-supply system at the moment of starting up and stopping the above power-supply devices.

Japanese Patent Publication (Laid-Open) No. 2001-8462 discloses starting up and stopping the operation of a power-supply device which, for the purpose of decreasing the adverse effects on a load potentially caused by the influx of a large rush or surge of current into the load at the moment of startup of the power-supply device, the voltage being supplied by a voltage-supplying means is gradually increased at the moment of startup of the power-supply device.

However, the above conventional art is based on the premise that the above process is solely executed by a single voltage-supplying means connected in parallel to an input terminal. Due to this, it is not practicable to keep the above output voltage constant, or optionally control the output voltage, or suppress the occurrence of higher harmonic waves, or control the current flow.

SUMMARY OF THE INVENTION

The invention has been devised so as to fully solve the above existing problems. The main object of the invention is to provide a power-supply device that is capable of minimizing the adverse effects on a load, such as those caused by a large surge of current flowing into the load during the starting up and stopping or shutting-down of the power-supply device, even when operating a power-supply device incorporating the operational functions of optional control of the output voltage, suppression of high harmonic waves, and control of the current flow.

A power-supply device according to one aspect of the invention essentially consists of a power-supply device incorporating a first voltage-supplying means (corresponding to a voltage-supplying unit 2 shown in FIG. 1 and FIG. 9) for producing an output voltage at an output terminal thereof, wherein the first voltage-supplying means is connected in series between an input terminal and the above output terminal thereof. The power-supply device further comprises a controlling-signal generating means (corresponding to a control unit 5 shown in FIG. 1 and FIG. 9) that generates a controlling signal for causing an input voltage to be offset via an output signal from the first voltage-supplying means during of startup of the power-supply device, and then causes the offset effect to be decreased gradually, wherein the controlling-signal generating means controls the first voltage-supplying means by operating the above controlling signal. Due to this arrangement, the value of the voltage at the output terminal of the power-supply device is minimized at the moment of startup of the power-supply device, thereby preventing generation of an excessive transient current variation in a load connected to the power-supply device.

A power-supply device according to another aspect of the invention incorporates a first voltage-supplying means for producing an output voltage at an output terminal thereof, wherein the first voltage-supplying means is connected in series between an input terminal and the output terminal thereof, wherein the power-supply device further comprises a controlling-signal generating means that generates a controlling signal for causing a gradually changing offsetting of an input signal via an output signal of said first voltage-supplying means, wherein the operation of the first voltage-supplying means is controlled by the above controlling signal. Due to this arrangement, the value of the voltage at the output terminal of the power-supply device is minimized at the moment of stopping the power-supply device, thereby preventing generation of a excessive transient variation in a load connected to the power-supply device.

According to another aspect of the invention, the power-supply device also includes a second voltage-supplying means (this corresponds to a voltage-supplying unit 1 shown in FIG. 1) connected in parallel between the input terminal and the output terminal of the power-supply device. In addition to the above-mentioned voltage-supplying means connected in series, when the power-supply device further comprises the above-mentioned voltage-supplying means connected in parallel, the value of the voltage at the output terminal of the power-supply device is minimized at the moment of starting up and stopping the power-supply device, thereby preventing generation of a excessive transient variation in a load connected to the power-supply device.

According to another aspect of the invention, the first voltage-supplying means incorporates a certain number of switching elements for power conversion; wherein the controlling-signal generating means comprises the following: a means for generating a level-varying signal for causing the signal level to vary gradually (this corresponds to a variation-rate limiter 9 shown in FIG. 1 and FIG. 9); a means for generating a voltage-instructing signal (for example, a sine-wave signal) to be output from the first voltage-supplying means when the power-supply device is operated (said means corresponds to an output-voltage reference signal generator 12 shown in FIG. 1 and FIG. 9); and a means for causing the level-varying signal to be multiplied by the voltage-instructing signal to be output (said means corresponds to a multiplier 10d shown in FIG. 1 and FIG. 9). Through the application of a controlling signal generated in response to the above multiplied result (the controlling signal corresponds to an output-voltage instruction 140 shown in FIG. 1 and FIG. 9), ON/OFF operations of the switching elements are controlled.

In summary, according to the invention, the power-supply device consists of a pair of power-supply units connected to each other via a series-parallel linkage or of a power-supply unit connected in series between an input terminal and an output terminal. When the supply of power is begun, the voltage of the power-supply unit connected in series between the input terminal and the output terminal is adjusted so as to be equal to the voltage of the other power-supply unit connected in parallel to the input terminal or the voltage at the input terminal, or so as to be closer to the magnitude of the voltage of the other power-supply unit or the voltage at the input terminal, and then causes the voltage supplied by the power-supply source connected in series between the input terminal and the output terminal to be lowered gradually, thereby adjusting the voltage at the output terminal to a desired value. On the other hand, when operation of the power-supply sources is stopped, it is so arranged that the voltage supplied by the power-supply source connected in series between the input terminal and the output terminal is gradually adjusted so as to be closer to the voltage supplied by the power-supply source connected in parallel to the input terminal or the voltage at the input terminal, and then, after the voltage at the output terminal of the power-supply device has been minimized, operation of the power-supply device is stopped. Through the above controlling steps, the voltage at the output terminal of the power-supply device is minimized at the moment of starting up or stopping the supply of voltage to the power-supply device, thereby preventing generation of a excessive transient variation in a load connected to the power-supply device.

According to the invention, due to the function of the above-mentioned voltage-supplying means disposed in series between the input terminal and the output terminal, when operation of the power-supply device is started up, by gradually lowering the output voltage of the voltage-supplying means from the condition in which the voltage at the input terminal remains to be cancelled, a gradual rise in the output voltage from the power-supply device can be achieved. On the other hand, when operation of the power-supply device is stopped, by gradually reinforcing the output voltage of the voltage-supplying means so as to cancel the input voltage, it is possible to gradually lessen the output voltage of the power-supply device. Accordingly, this power-supply device is capable of minimizing the adverse effects on a loaded apparatus, such as that caused by a rush current flowing into an external load at the moment of switching of the power-supply device.

DETAILED DESCRIPTION OF THE PREFERRED EMBODIMENTS

Figure 1:
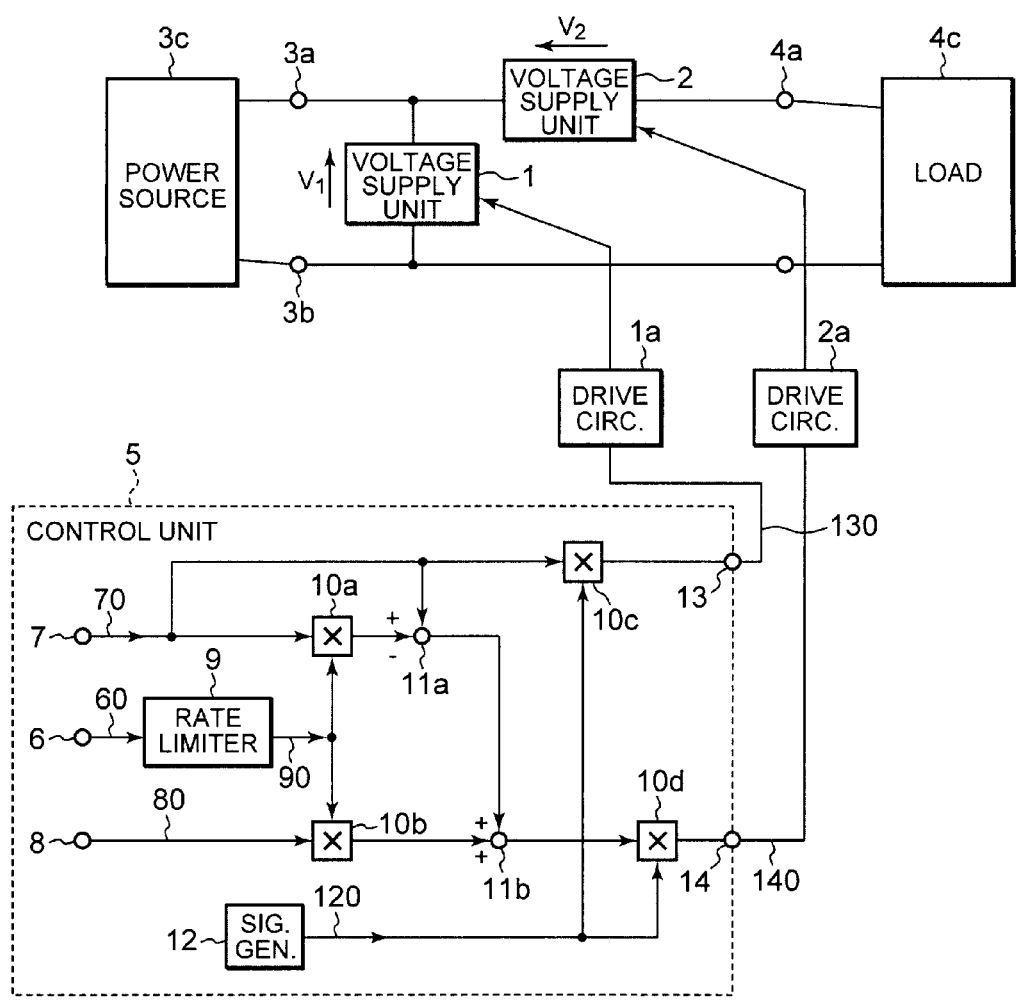
FIG. 1 is a simplified block diagram of a circuit of the power-supply device according to the first embodiment of the invention.

Referring now to the accompanying drawings, practical forms or embodiments for implementing the invention will be described below. Note that, in each of the accompanying drawings, those components corresponding to the ones shown in other drawings are represented by identical reference numerals.

The First Embodiment

FIG. 1 is a schematic block diagram of a circuit representing the first embodiment of power-supply device according to the invention. The power-supply device based on the first embodiment essentially comprises the following: an AC voltage-supply unit 1 connected in parallel to input terminals 3a and 3b; another AC voltage-supply unit 2 connected in series between an input terminal 3a and an output terminal 4a; and a control unit 5 that generates control signals for the voltage-supply unit 1 and the other voltage-supply unit 2 so as to controls these voltage-supplying units by way of gate drive circuits 1a and 2a. During use of the power supply device, a load 4c (one or more load apparatuses) is connected to the output terminals 4a and 4b, and a commercial AC power source 3c is connected to the input terminals 3a and 3b. For example, the power source 3c would typically supply 60 Hz AC power at a usual voltage of around 110 volts RMS (root-mean-square) in the United States. The power source 3c may be a commercial power distribution system.

As will be discussed in more detail below, power is supplied to the load 4c through the voltage supply unit 2 when the power source 3c is normal. When an abnormality occurs, the voltage supply units 1 and 2 serve jointly to supply power to the load 4c.

In the first embodiment of the invention, by providing an opposite voltage V1 that is equal to the voltage across the input terminals 3a and 3b, the voltage-supplying unit 1 operates so as to support the voltage on the input side. Further, the voltage supply unit 1 functions to maintain the voltage inside the power-supply device and to compensate for high harmonic current and reactive current. The voltage supply unit 2 functions so as to adjust the output voltage at the output terminals 4a and 4b by providing a differential voltage V2 between the voltage that is secured by the output terminal 4a and at the input terminal 3a.

Figure 12A:
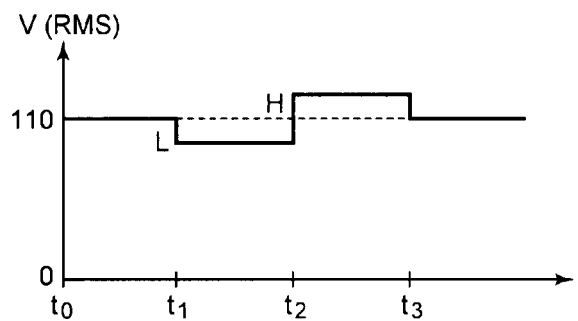
FIGS. 12A–12B illustrate an example of voltage-instructing values received by the arrangement shown in FIG. 1.
Figure 12B:
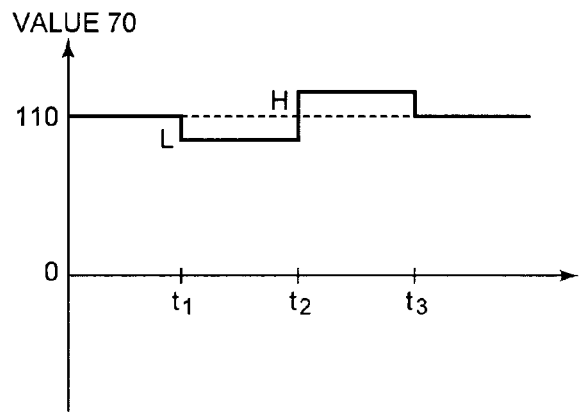
Figure 12C:
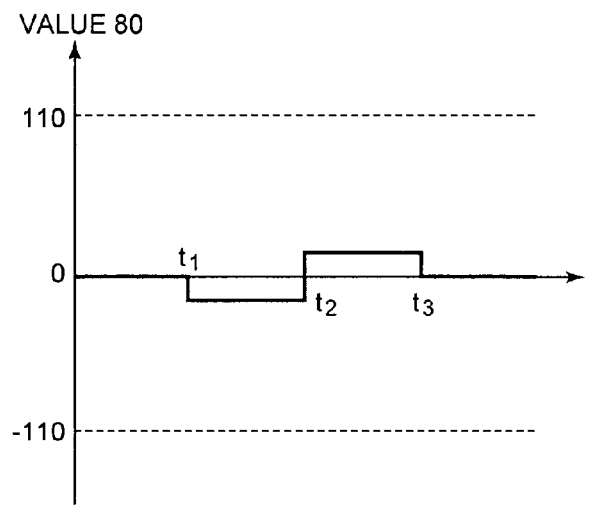

Next, the construction of the control unit 5 will be described below. The control unit 5 essentially comprises a signal terminal 7 that receives a voltage-instructing value 70 and another signal terminal 8 that receives a voltage-instructing value 80. The voltage-instructing values are generated from the voltage sensed at the voltage supply units 1 and 2 (for example, by a sensor across a capacitor 16 that will be discussed later, although this sensor is not shown in the drawings). The voltage-instructing values 70 and 80 are DC values that vary in amplitude in response to the RMS voltage sensed at the voltage supply units 1 and 2. An example is shown in FIGS. 12A–12C. In FIG. 12A, suppose that the RMS voltage sensed between input terminal 3a and input terminal 3b has an RMS value of 110 volts (the target voltage) at a time $t_0$. In this example, the time to occurs during normal operation of the power-supply device, well after it has been started. The sensed voltage falls by an amount L at time $t_1$, and rises above 110 volts by an amount H at time $t_2$. At time $t_3$, the sensed voltage returns to the target voltage and remains there (in this example) thereafter. FIG. 12B shows the resulting voltage-instructing value 70. It matches the sensed voltage shown in FIG. 12A. That is, the value 70 instructs the voltage supply unit 1 to produce the target voltage during the interval from $t_0$ to $t_1$, the target voltage less the amount L during the interval from $t_1$ to $t_2$, the target voltage plus the amount H during the interval from $t_2$ to $t_3$, and the target voltage from $t_3$ onward. The voltage instructing value 80 resulting from the situation shown in FIG. 12A is shown in FIG. 12C. The value 80 instructs the voltage supply unit 2 to leave the voltage across the voltage supply unit 1 unchanged from $t_0$ to $t_1$ and to increase it by the amount L from $t_1$ to $t_2$. From $t_2$ to $t_3$, the value 80 instructs the voltage supply unit 2 to decrease the voltage across voltage supply unit 1 by the amount H. After time $t_3$, the value 80 again instructs the voltage supply unit 2 to leave the voltage across the voltage supply unit 1 unchanged. It will be apparent that the net result is that the RMS voltage received by the load 4c is fixed at the target voltage (here, 110 volts) despite the variations in the power source voltage.

The control unit 5 also includes a signal terminal 6, which receives an activation signal 60 that is level "0" when the power-supply device remains off, (when power is not supplied to the load 4c), and becomes level "1" when the power-supply device is in operation (when power is supplied to the load 4c). A variation-rate limiter 9 which, upon receipt of a signal from the signal terminal 6, limits the variation rate of the signal level. Also included are multipliers 10a to 10d; adders 11a to 11d, and an output-voltage reference signal generator 12. An output terminal 13 that outputs an output-voltage instruction 130 to the gate drive circuit 1a. Another output terminal 14 outputs an output-voltage instruction signal 140 to the gate drive circuit 2a.

The variation-rate limiter 9 limits the variation rate even when the signal 60 suddenly varies, in order to ensure that the rate of variation in the output level is limited to a predetermined maximum variation rate. Accordingly, as shown in FIG. 2C, when operation of the power-supply device is started up (the activation signal 60 becomes "1"), the output signal 90 from the variation-rate limiter 9 varies so that the signal level will gradually rise. Conversely, when operation of the power-supply device is stopped, as shown in FIG. 3C, the output signal from the variation-rate limiter 9 varies so that the signal level will gradually fall after the activation signal 60 changes to "0".

The output signal 90 from the variation-rate limiter 9 is transmitted to the multiplier 10a. The signal value output from the multiplier 10a is subtracted from the instruction value 70 by the adder 11a. Therefore, when operation of the power supply device is started up, the signal value output from the adder 11a gradually decreases from the instruction value 70 until eventually it is reduced to "0." When operation of the power-supply device is stopped, the above routine is reversed, so that the signal value output from the adder 11a gradually rises from "0" before eventually reaching the instructed value 70.

The output-voltage reference signal generator 12 consists of a well-known PLL (phase-locked loop) circuit, which inputs the voltage of the power source 3c and outputs a sine-wave signal 120 matching the phase and the period. A voltage output instruction 130 (an instantaneous value), which is supplied to the gate drive circuit 1a, is computed by the multiplier 10c as the product of the output signal 120 of the reference signal generator 12 and the instruction value 70.

A voltage output instruction 140, which is supplied to the gate drive circuit 2a, is computed by a multiplier 10d. It multiplies the output signal 120 by the sum of (1) the product of an output signal 90 from the variation-rate limiter 9 and the instruction value 80 computed by the multiplier 10b and (2) an output result computed by the adder 11a.

Procedure for Starting up the Power-Supply Device

Figure 2A:
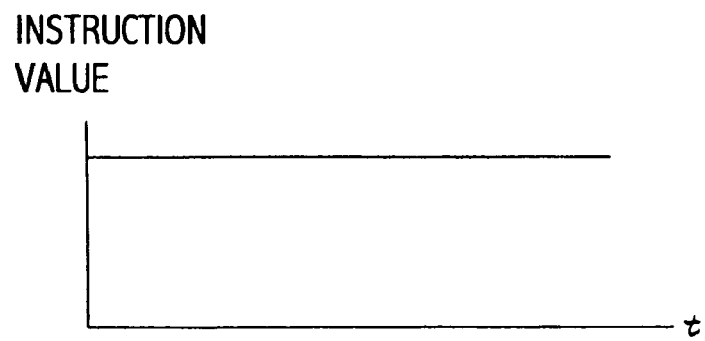
FIGS. 2a–2C are waveforms representing the internal signals of the control unit when the power-supply device according to the invention is started up.

Based on the above arrangement, the case in which the terminal 7 receives an instruction value 70 as shown in FIG. 2A at startup of the power-supply device will now be considered. In this case, since the multiplier 10a outputs "0" immediately after the instant of starting up the power-supply device, the value output from the adder 11a at the instant of startup corresponds to the instruction value 70. Furthermore the multiplier 10*b* also outputs "0" at the instant of startup. Thereafter, the output signal 90 from the variation-rate limiter 9 gradually rises to "1," thereby causing the output value from the multiplier 10*a* to gradually rise to a value identical to that of the instruction value 70. As a result, the output from the adder 11*a* gradually falls to "0."

Figure 2B:
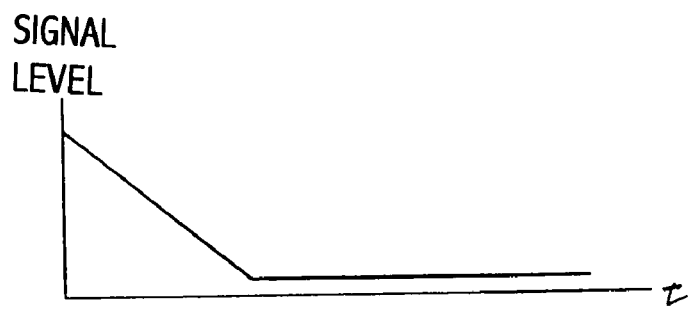
Figure 2C:
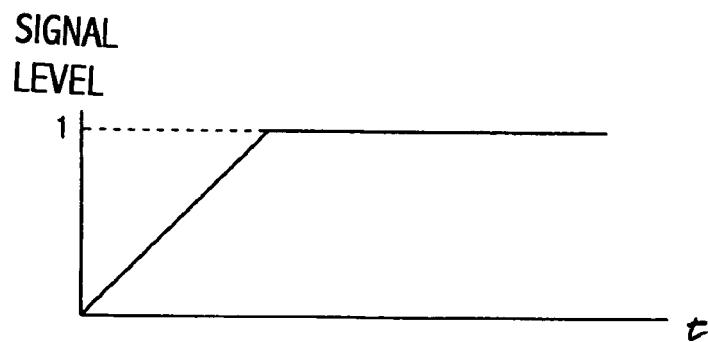

On the other hand, the output from the multiplier 10*b* gradually rises from "0" to the instruction value 80. Accordingly, when the output signal from the variation-rate limiter 9 becomes "1" to complete the startup procedure, the output signal from the multiplier 10*b* becomes equal to the instruction value 80. Therefore, the output signal from the adder 11*b* varies as shown in FIG. 2B. It will be apparent that the initial signal level shown in FIG. 2B corresponds to the instruction value 70, and after the signal level falls, the final signal level corresponds to instruction value 80. As a result, the voltage output instruction signal 140 output from the control unit 5 varies as shown in FIG. 4B. The voltage output instruction 130 from the control unit 5 is shown in FIG. 4A (a sine wave having a peak amplitude corresponding to the instruction value 70).

Procedure for Stopping the Power-Supply Device

Figure 3A:
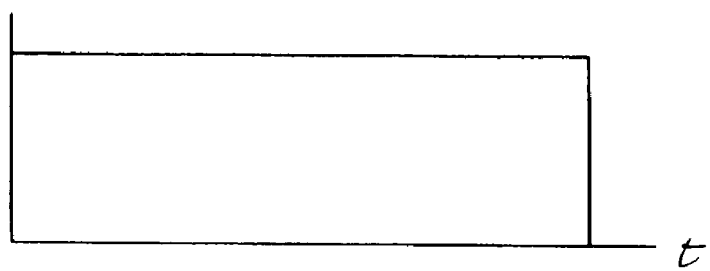
FIGS. 3A–3C are waveforms representing the internal signals of the control unit when the power-supply device according to the invention is stopped.
Figure 3B:
Figure 3C:
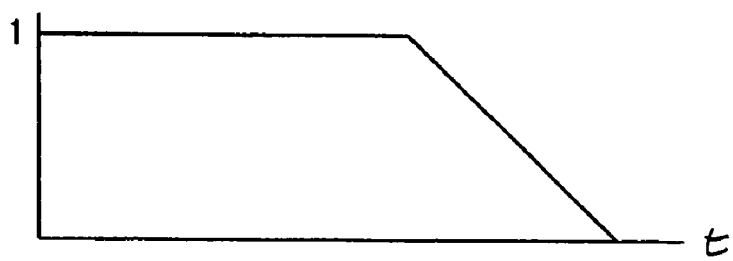

In the case in which the terminal 7 receives an instruction value 70 as shown in FIG. 3A at shut-down or the stopping of the power-supply device will now be considered. The level of the signal 90 output from the variation-rate limiter 9 gradually falls after the activation signal 60 becomes "0", thereby causing the output value from the adder 11*b* to also vary as shown in FIG. 3B. As a result, the voltage output instruction signal 140 transmitted to the gate drive circuit 2*a* varies as shown in FIG. 4C. Note that the voltage output instruction signal 140 corresponds to an output signal of the multiplier 10*d*, representing the product of the value output from the adder 11*b* and the output signal 120 from the output-voltage reference signal generator 12.

Figure 4A:
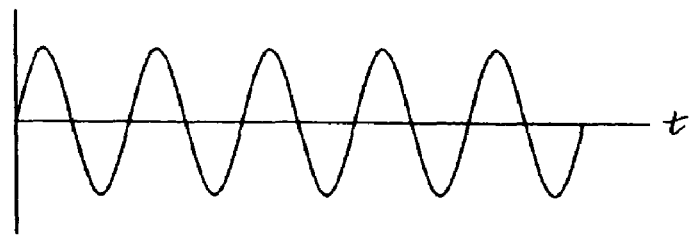
FIGS. 4A–4C are waveforms exemplifying the operations of individual parts of the power-supply device according to the invention.
Figure 4B:
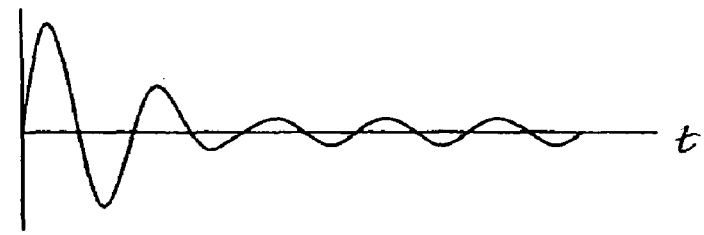
Figure 4C:
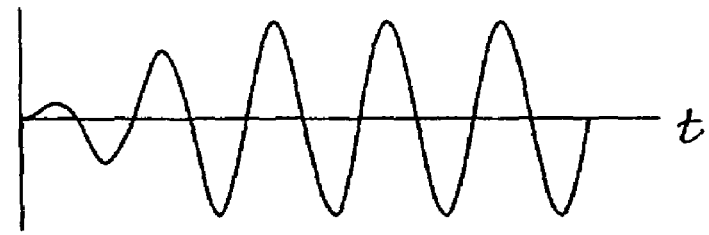

The voltage output instruction signal 130 transmitted to the gate drive circuit 2*a* is shown in FIG. 4A, the same as the situation at startup.

Operation for Controlling the Voltage-Supplying Units

As described above, when operation of the power-supply device is started up, the voltage output instruction signal 140 output from the control unit 5 for transmission to the voltage-supplying unit 2 via the gate drive circuit 2*a* varies as shown in FIG. 4B. Conversely, when the operation of the power-supply device is stopped, the voltage output instruction signal 140 varies as shown in FIG. 4C. Accordingly, the output-voltage instruction signal 140 constitutes a controlling signal that initially causes the output signal from the voltage-supplying unit 2 to be offset when operation of the power-supply device is started up, and then further causes the offset effect to gradually diminish. On the other hand, when the power-supply device is shut down or stopped, the controlling signal causes the offset effect to be gradually strengthened.

The voltage output instruction signal 140 is subjected to pulse-width modulation (PWM) by the gate drive circuit 2*a*. The resulting pulse-width modulated signals are then transmitted to the gate terminals of semiconductor switching elements (to be described later) in the voltage supply unit 2. By causing the semiconductor switching elements to perform switching operations, the voltage supply unit 2 functions as a power converter (or inverter) that generates a simulated AC output having an amplitude corresponding to the voltage output instruction signal 140.

Figure 5A:
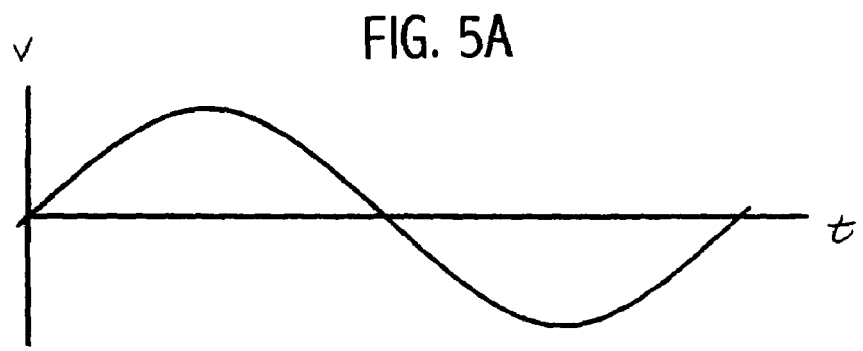
FIGS. 5A–5C are waveforms exemplifying the pulse-width modulating process.
Figure 5B:
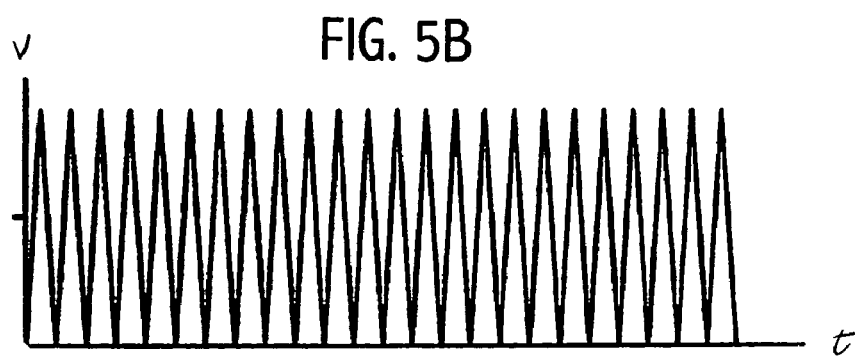
Figure 5C:
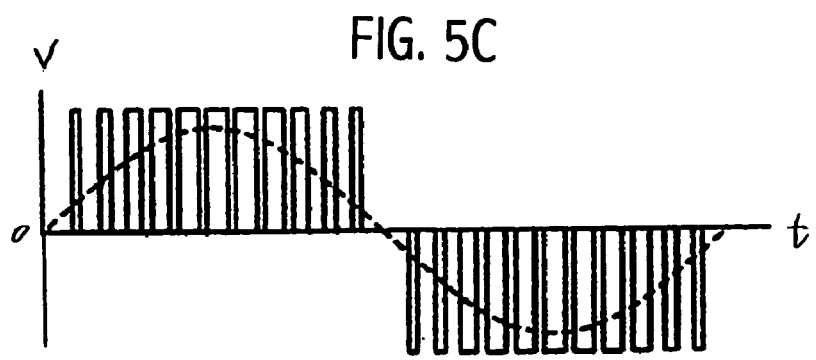

Although the pulse-width modulation technique for simulating a sine wave is well known, an example will be briefly described with reference to FIG. 5A–5C. One cycle of the voltage output instruction signal 140 is shown in FIG. 5A. The signal is full-wave rectified (which inverts the negative half-cycle) and supplied to one input terminal of a comparator (not shown) The other input terminal of the comparator receives a triangular wave signal as shown in FIG. 5B. The comparator then emits a sequence of pulses whose widths depend on the relative amplitudes of the two input signals as time progresses. A set of pulses generated during the positive half-cycle of the sine wave (FIG. 5A) can then be combined with a set of pulses generated during the negative half-cycle to simulate the original sine wave as shown in FIG. 5C. The pulses are supplied to the gates of switching elements in the voltage supply unit 2 to turn the switching elements ON and OFF. The switching elements control current from a DC power source (such as a battery or a capacitor that is kept charged) to generate powerful pulses that simulate the original input signal.

The above description has focused on the voltage supply unit 2 and its gate drive circuit 2*a*, but is equally applicable to the voltage supply unit 1 and gate drive circuit 1*a*.

As a result of execution of the above-mentioned controlling operations, it is possible, by using two voltage-supplying units, for the power-supply device shown in FIG. 1 to control the output voltage at terminals 4*a* and 4*b*, to suppress the occurrence of high harmonic waves, and to control the current flow, and yet it is also possible to minimize the adverse effects on load 4*c* that might otherwise be caused by an influx of a large surge of current into the load at the moment of starting up.

Exemplary Constructions of the Voltage-Supplying Units

Figure 6:
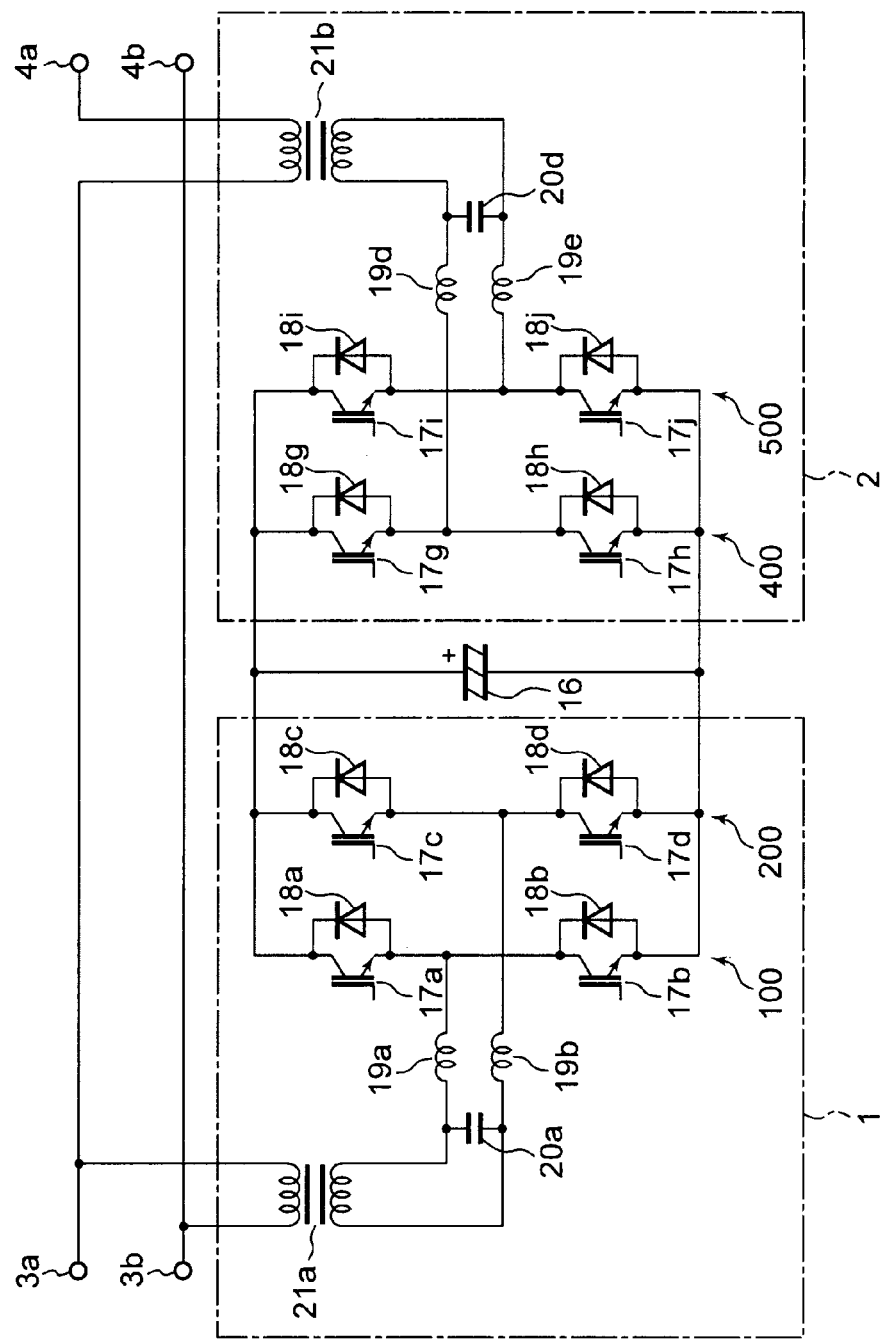
FIG. 6 is a circuit block diagram incorporating a power converter added to the circuit shown in FIG. 1.
Figure 7:
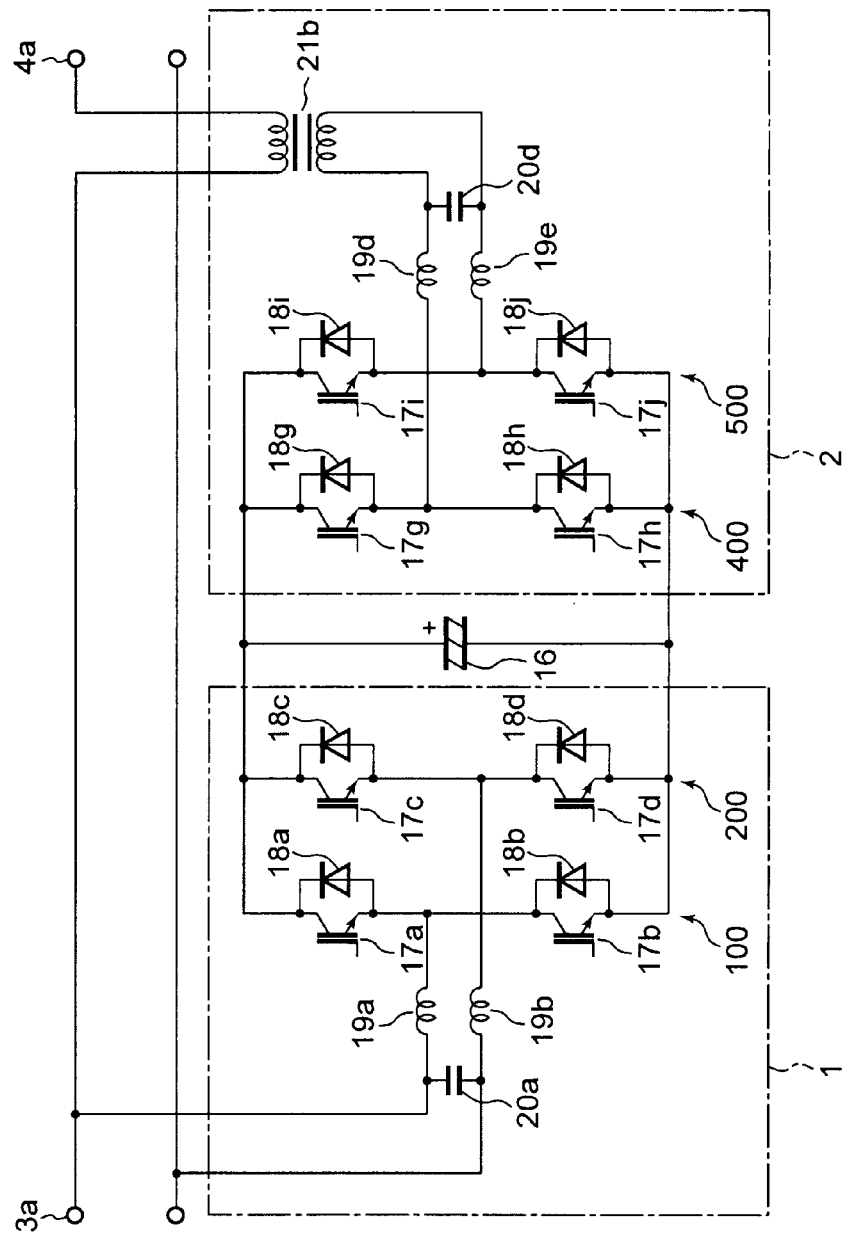
FIG. 7 is a circuit block diagram with a transformer removed from the circuit shown in FIG. 6.
Figure 8:
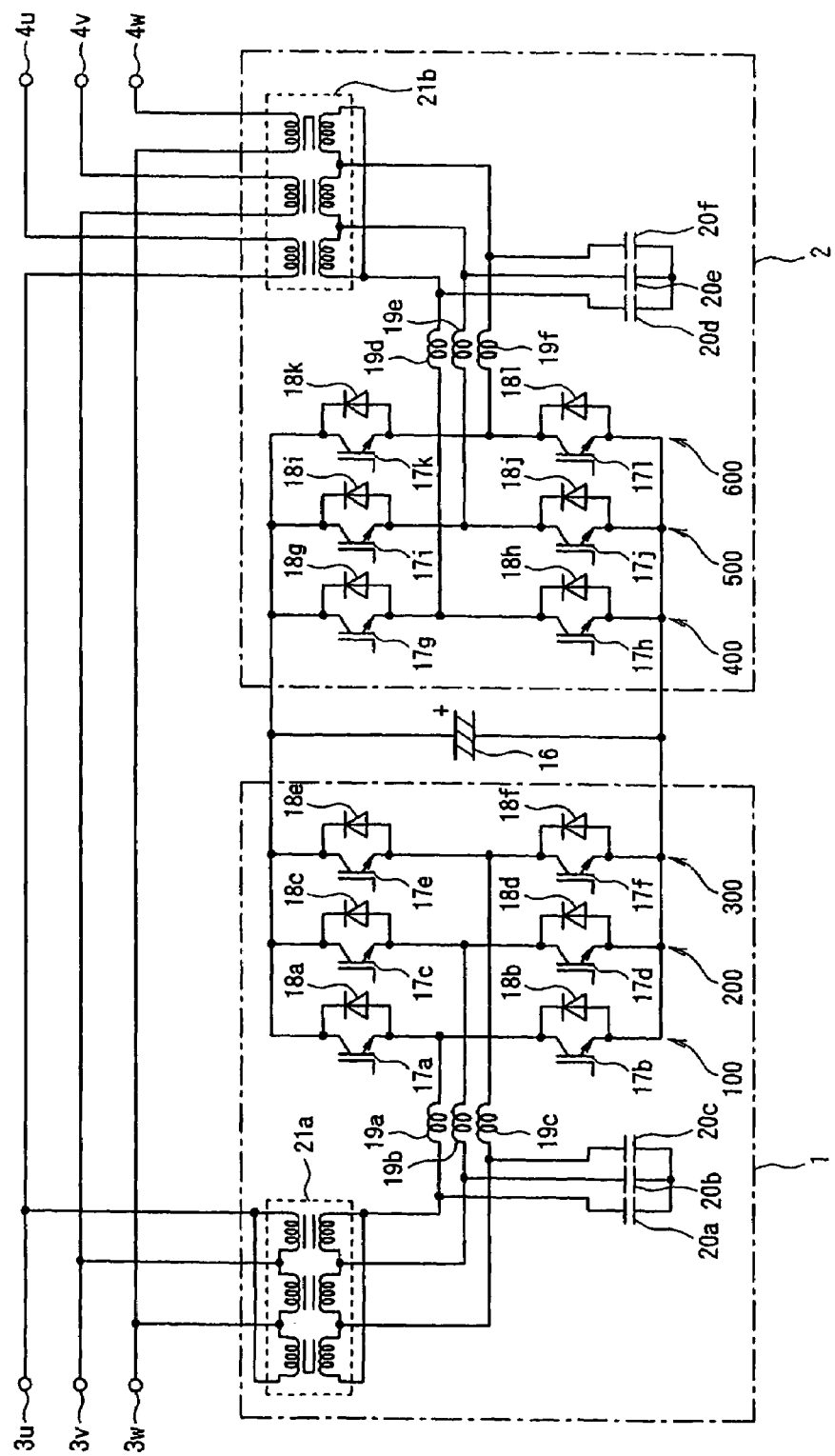
FIG. 8 is a concrete circuit block diagram in which the circuit construction shown in FIG. 7 is applied to the three-phase, three-line format.

Concrete examples of circuits for the voltage-supply units 1 and 2 are shown in FIG. 6 to FIG. 8, and are described below.

The voltage-supplying unit 1 shown in FIG. 6 consists of a pair of series connectors 100 and 200 that are connected in parallel and that include two pairs of series-connected semiconductor switching elements 117*a* to 17*d*. The semiconductor switching elements 17*a* to 17*d* are metal-oxide semiconductor field effect transistors (MOSFETs) or insulated-gate bipolar transistors (IGBTs). Further, diodes 18*a* to 18*d* are connected to the corresponding semiconductor switching elements 17*a* to 17*d* in an anti-parallel arrangement.

One end of a reactor 19*a* (an inductor) is connected to the junction between the semiconductor switching elements 17*a* and 17*b*. Likewise, an end of a reactor 19*b* is connected to the junction between the semiconductor switching elements 17*c* and 17*d*. Further, the other ends of the reactors 19*a* and 19*b* are connected to a capacitor 20*a*. The reactors 19*a* and 19*b* and the capacitor 20*a* jointly function as a filter.

Similarly, the voltage-supplying unit 2 is also provided with a pair of series connectors 400 and 500 that are connected in parallel with each other and that include two pairs of semiconductor switching elements 17*g* to 17*j*. Further, diodes 18*g* to 18*j* are connected to the corresponding semiconductor switching elements 17*g* to 17*j* in an anti-parallel arrangement.

An end of a reactor 19*d* is connected to the junction between the semiconductor switching elements 17*g* and 17*h*. In the same way, an end of a reactor 19*e* is connected to the junction between the semiconductor switching elements 17*i* and 17*j*. Further, the other ends of the reactor 19*d* and the reactor 19e are connected to a capacitor 20d. Accordingly, the reactor 19d, the reactor 19e, and the capacitor 20d jointly function as a filter.

DC intermediate capacitor 16 for smoothing is shared by the voltage-supply units 1 and 2. A transformer 21a is disposed on the output side of the voltage-supply unit 1 and, likewise, another transformer 21b is disposed on the output side of the voltage-supply unit 2. While both of transformers 21a and 21b have been characterized here as output transformers, it should be apparent that either of them can alternatively serve as an input transformer to convey energy for charging the capacitor 16, thereby providing a power source for the other voltage supply unit.

By controlling the ON/OFF operation of individual semiconductor switching elements through the application of the voltage output instructions 130 and 140 and the gate drive circuits 1a and 2a, the output voltage of the voltage supply unit 2 can be gradually lowered from the state of canceling the voltage on the input side during startup of the power-supply device, and a gradual rise in the output voltage from the power-supply device can be realized. Conversely, by gradually increasing the output voltage of the voltage supply unit 2 so as to cancel the input voltage during shut-down or stopping of the power-supply device, it is possible to gradually lower the output voltage from the power-supply device. As a result, it is possible to minimize adverse effects on the load that might otherwise be caused by a surge of current into the load at the startup and stopping of the power-supply device.

It should be noted that a power converter (or inverter) comprising the voltage-supplying units 1 and 2 shown in FIG. 7 avoids the need for a transformer 21a disposed on the output side of the first voltage-supplying unit 1 shown in FIG. 6. Further details of operation are omitted here.

The voltage-supplying units 1 and 2 shown in FIG. 8 have been developed from the circuit shown in FIG. 6 into a three-phase/three-line-format power-supply unit incorporating three input terminals, including 3u, 3v, and 3w, and three output terminals, including 4u, 4v, and 4w. The voltage-supply unit 1 comprises three units of series connectors 100, 200, and 300 connected in parallel with each other, and with pairs of semiconductor switching elements 17a to 17f (consisting of MOSFETs or IGBTs) connected in series. Further, diodes 18a to 18f are connected to the corresponding semiconductor switching elements 17a to 17f in an anti-parallel arrangement.

An end of a reactor 19a is connected to the junction between the semiconductor switching elements 17a and 17b. Further, an end of a reactor 19b is connected to the junction between the semiconductor switching elements 17c and 17d. An end of a reactor 19c is connected to the junction between the semiconductor switching elements 17e and 17f. Capacitors 20a to 20c are connected with each other between the other ends of the reactors 19a to 19c. Accordingly, the reactors 19a to 19c and the capacitors 20a to 20c jointly function as a filter.

Similarly, in the voltage-supplying unit 2, series connectors 400, 500, and 600 are connected in parallel with each other, and each includes a series-connected pair of semiconductor switching elements 17g to 17l (consisting of either MOSFET or IGBT transistors). Further, as in the case of the arrangement in the voltage-supplying unit 1, diodes 18g to 18l are connected to the corresponding semiconductor switching elements 17g to 17l in an anti-parallel arrangement.

An end of the reactor 19d is connected to the junction between the semiconductor switching elements 17g and 17h.

Further, an end of the reactor 19e is connected to the junction between the semiconductor switching elements 17i to 17j. Also, an end of the reactor 19f is connected to the junction between the semiconductor switching elements 17k to 17l. A plurality of capacitors 20d to 20f are connected with each other between the other ends of the reactors 19d to 19f. Accordingly, the reactors 19d to 19f and the capacitors 20d to 20f jointly function as a filter.

In the above-mentioned power converter consisting of the power-supply unit 1 and the power-supply unit 2 shown in FIG. 8, one DC intermediate capacitor 16 for smoothing is shared by the voltage-supplying units 1 and 2. Further, a power transformer 21a is disposed on the output side of the voltage-supply unit 1 and, likewise, a power transformer 21b is disposed on the output side of the voltage-supply unit 2. A further description of their operations is omitted here.

Even though the voltage-supplying unit 1 and the voltage-supplying unit 2 are employed, the above control unit 5 makes it possible to minimize adverse effects on the load that might otherwise be caused by a surge of current during the starting or stopping of the power-supply device.

The Second Embodiment

Figure 9:
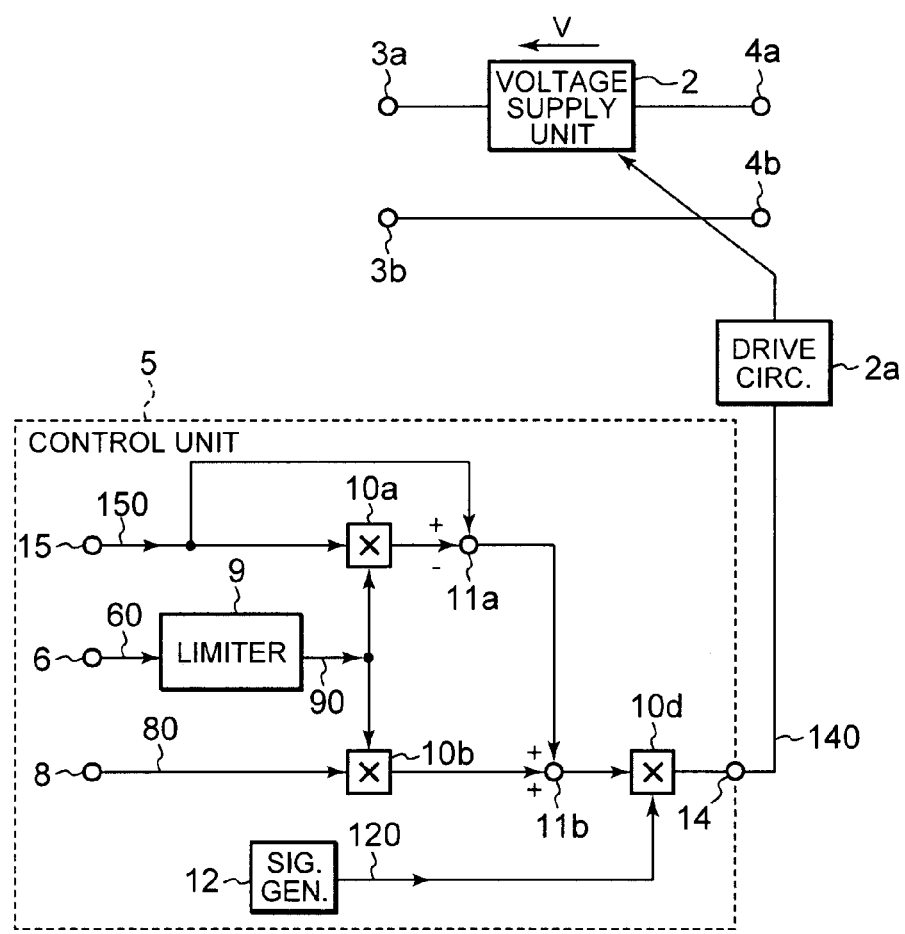
FIG. 9 is a circuit block diagram of the power-supply device according to a second embodiment of the invention.

FIG. 9 is a block diagram of an example according to the second embodiment of a power-supply device according to the invention. In the second embodiment, a voltage-supply unit 2 is connected in series between an input terminal 3a and an output terminal 4a. A voltage-supply unit 1 connected in parallel between the input terminals 3a and 3b as in the circuit shown in FIG. 1 is omitted here.

In the second embodiment, the voltage-supplying unit 2 outputs a differential voltage V denoting the difference between a voltage to be secured by the output terminals 4a and 4b, and a voltage applied to the input terminals 3a and 3b, and functions so as to compensate for the output voltage at the output terminals 4a and 4b.

The above-mentioned multiplier 10c and the output terminal 13 provided for the control unit 5 shown in FIG. 1 are deleted from the circuit shown in FIG. 9. Since the construction and functional operation of the controller unit 5 shown in FIG. 9 are substantially identical to those of the control unit 5 shown in FIG. 1 according to the first embodiment, only the different points are described below.

An input-voltage signal 150 added to an input terminal 15 corresponds precisely to the voltage across input terminals 3a and 3b. The input-voltage signal 150 can be generated by previously determining a preset value (for example, one which would yield a 110 volt RMS output by the voltage supply unit 2, in the U.S.) or by using a detector to detect the actual voltage across the input terminals 3a and 3b.

An adder 11a outputs a signal corresponding to the difference between the input-voltage signal 150 and a value output from the multiplier 10a. Accordingly, when starting operation of the power-supply device, it is possible to change the output voltage of the voltage-supplying unit 2 from a value substantially equivalent to the input voltage applied across the terminals 3a and 3b. On the other hand, when the power-supply device is stopped, it is possible to change the output voltage of the voltage-supplying unit 2 to a value substantially equivalent to the input voltage.

Exemplary Construction of the Voltage-Supplying Unit

Figure 10:
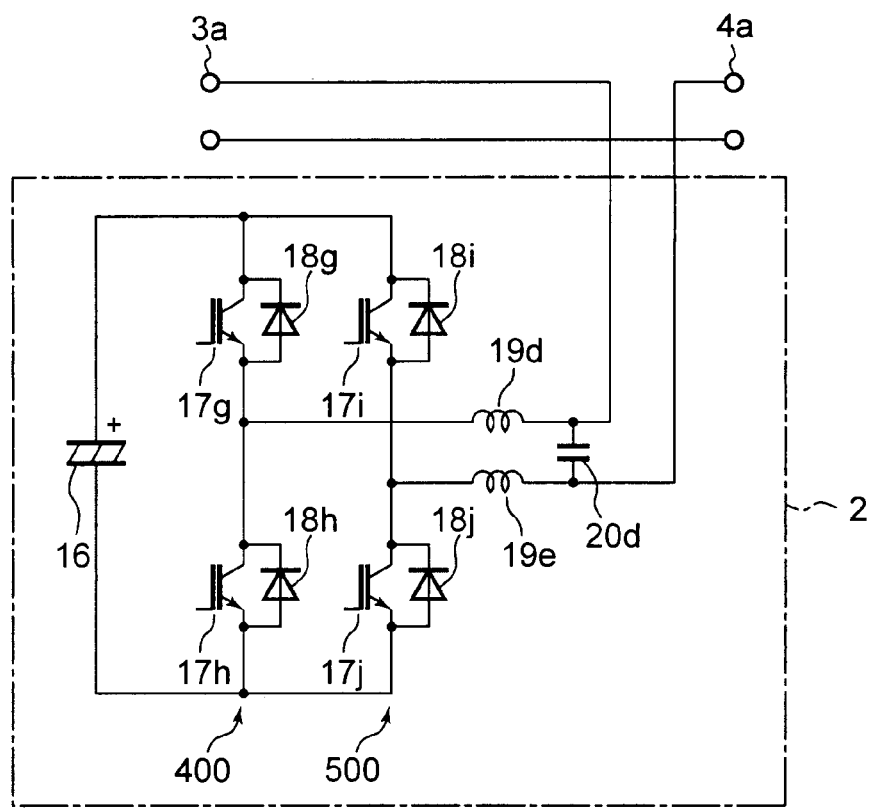
FIG. 10 is a circuit block diagram exemplifying the application of a power converter to the circuit shown in FIG. 9.
Figure 11:
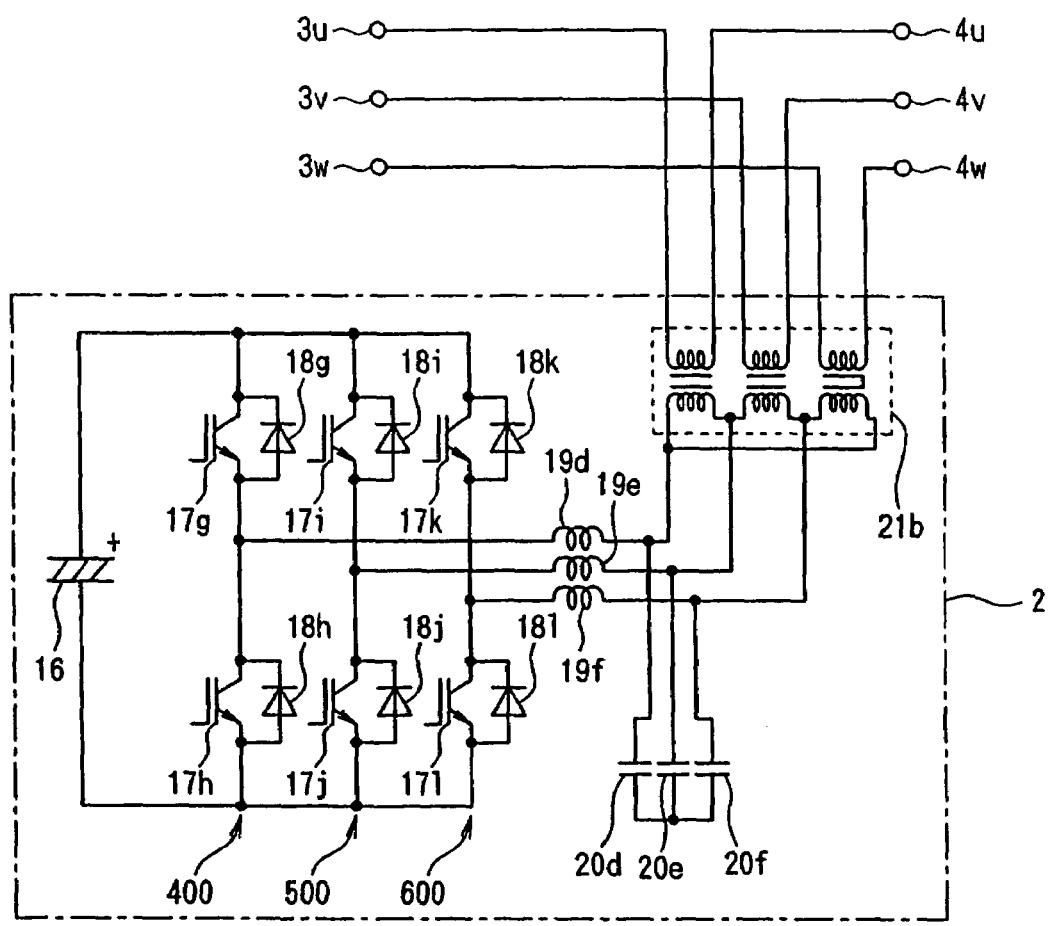
FIG. 11 is a circuit block diagram exemplifying the application of the circuit constitution shown in FIG. 10 to a three-phase, three-line-format circuit.

The voltage-supplying unit 2 according to the second embodiment of the invention can be constructed as shown in FIG. 10 or FIG. 11. The voltage-supplying unit 2 shown in FIG. 10 has a construction identical to that of the voltage-supplying unit 2 shown in FIG. 6. Concretely, a pair of series connectors 400 and 500 are connected to each other in parallel. Two series-connected pairs of semiconductor switching elements 17g to 17j are connected in parallel in these series connectors 400 and 500. Further, diodes 18g to 18j are connected to the corresponding semiconductor switching elements 17g to 17j in an anti-parallel arrangement.

An end of a reactor 19d is connected to the junction between the semiconductor switching elements 17g and 17h. Likewise, an end of a reactor 19e is connected to the junction between the semiconductor switching elements 17i and 17j. Further, a capacitor 20d is connected to the other ends of the reactors 19d and 19e. Accordingly, the reactors 19d and 19e and the capacitor 20d jointly function as a filter.

A DC intermediate capacitor 16 for smoothing is disposed in the voltage-supplying unit 2. In this embodiment, the control unit 5 outputs a controlling signal consisting of a voltage output instruction signal 140, which is then subject to a pulse-width modulated by the gate drive circuit 2a so as to form drive signals. The drive signals are transmitted to the gate terminals of individual semiconductor switching elements 17g to 17j. By causing these individual semiconductor switching elements to perform switching operations, they jointly function as a full-bridge converter.

When the above voltage-supplying unit 2 is employed, the above control unit 5 makes it possible to minimize adverse effects on a load that might otherwise be caused by a large current surge into the load during startup and stopping of the power-supply device.

The voltage-supply unit 2 shown in FIG. 11 consists of a three-phase, three-line format developed from the circuit construction shown in FIG. 10. The actual constitution of the voltage-supply unit 2 shown in FIG. 11 is identical to that shown in FIG. 8. Accordingly, the voltage-supply unit 2 shown in FIG. 11 is provided with three input terminals, including 3u, 3v, and 3w, and corresponding output terminals 4u, 4v, and 4w. Further, a power transformer 21b is provided on the output side of the power converter, thereby enabling the voltage-supplying unit 2 to be connected to the power-supply line via the power transformer 21b.

Even with the above circuit construction, as in the preceding embodiment, the control unit 5 shown in FIG. 9 outputs a voltage output instruction signal, which is then subject to pulse-width modulation so as to provide drive signals. The drive signals are then transmitted to the gate terminals of individual semiconductor switching elements 17. In consequence, by causing these semiconductor switching elements 17 to individually perform ON/OFF switching operations, they jointly function as a full-bridge converter (or inverter). When the above voltage-supply unit 2 is employed, due to the provision of the control unit 5, it is possible to securely minimize adverse effects on a load that might otherwise be caused by a large surge of current into the load during startup and stopping of the power-supply device.

Thus, as described above, according to the invention, even in the case of a power-supply device incorporating specific functions such as optional control of the output voltage, suppression of high harmonic waves, control of the current flow, or the like, it is possible to minimize adverse effects on a load during startup and stopping of the power-supply device.

It will be understood that the above description of the present invention is susceptible to various modifications, changes, and adaptations, and the same are intended to be comprehended within the meaning and range of equivalents of the appended claims.

The invention claimed is:

1. A power-supply device for use between a power source and a load, comprising:
    an input terminal for connection to the power source;
    an output terminal for connection to the load;
    a first voltage supply means for generating an output voltage in response to control signals, the first voltage supply means being connected between the input terminal and the output terminal; and
    control-signal generating means for generating the control signals for the first voltage supply means, such that the control signals enable the output voltage from the first voltage supply means to offset a voltage present at the input terminal when the power-supply device is started up, and to then cause the offset to gradually decline.

2. The power supply device of claim 1, wherein the input terminal is a first input terminal, and further comprising a second input terminal and a second voltage-supply means connected between the first and second input terminals.

3. The power-supply device of claim 2, wherein:
    the first voltage supply means comprises a plurality of first switching elements for converting electric power,
    the second voltage supply means comprises a plurality of second switching elements for converting electric power, and
    the control signal generating means comprises means for generating a level-varying signal, means for generating a product by multiplying the level-varying signal by a voltage instruction signal that designates the output voltage of the first voltage supply means, and means responsive to the product for generating the drive signals for the first voltage supply means, the drive signals controlling an ON/OFF condition of the first switching elements.

4. The power-supply device of claim 1, wherein:
    the first voltage supply means comprises a plurality of first switching elements for converting electric power, and
    the control signal generating means comprises means for generating a level-varying signal, means for generating a product by multiplying the level-varying signal by a voltage instruction signal that designates the output voltage of the first voltage supply means, and means responsive to the product for generating the drive signals for the first voltage supply means, the drive signals controlling an ON/OFF condition of the first switching elements.

5. The power-supply device of claim 1, wherein the power source is an AC power source and the first voltage supply means comprises a power inverter.

6. A power-supply device for use between a power source and a load, comprising:
    an input terminal for connection to the power source;
    an output terminal for connection to the load;
    a first voltage supply means for generating an output voltage in response to control signals, the first voltage supply means being connected between the input terminal and the output terminal; and
    control-signal generating means for generating the control signals for the first voltage supply means, such that the control signals enable the output voltage from the first voltage supply means to gradually rise from a low level when the power-supply device is being stopped to a level that offsets a voltage present at the input terminal.

7. The power supply device of claim 6, wherein the input terminal is a first input terminal, and further comprising a second input terminal and a second voltage-supply means connected between the first and second input terminals.

8. The power-supply device of claim 7, wherein:
the first voltage supply means comprises a plurality of first switching elements for converting electric power,
the second voltage supply means comprises a plurality of second switching elements for converting electric power, and
the control signal generating means comprises means for generating a level-varying signal, means for generating a product by multiplying the level-varying signal by a voltage instruction signal that designates the output voltage of the first voltage supply means, and means responsive to the product for generating the drive signals for the first voltage supply means, the drive signals controlling an ON/OFF condition of the first switching elements.

9. The power-supply device of claim 6, wherein:
the first voltage supply means comprises a plurality of first switching elements for converting electric power, and
the control signal generating means comprises means for generating a level-varying signal, means for generating a product by multiplying the level-varying signal by a voltage instruction signal that designates the output voltage of the first voltage supply means, and means responsive to the product for generating the drive signals for the first voltage supply means, the drive signals controlling the ON/OFF condition of the first switching elements.

10. The power-supply device of claim 6, wherein the power source is an AC power source and the first voltage supply means comprises a power inverter.

* * * * *